US012069414B2

(12) United States Patent
Ma

(10) Patent No.: US 12,069,414 B2
(45) Date of Patent: *Aug. 20, 2024

(54) METHOD AND APPARATUS FOR TRANSMITTING VIDEO SIGNALS, AND DISPLAY DEVICE

(71) Applicant: BOE TECHNOLOGY GROUP CO., LTD., Beijing (CN)

(72) Inventor: Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,323

(22) Filed: Jul. 7, 2023

(65) Prior Publication Data

US 2023/0362336 A1 Nov. 9, 2023

Related U.S. Application Data

(63) Continuation of application No. 17/627,164, filed as application No. PCT/CN2021/070623 on Jan. 7, 2021, now Pat. No. 11,758,097.

(30) Foreign Application Priority Data

Jan. 16, 2020 (CN) .......................... 202010049401.1

(51) Int. Cl.
  *H04N 7/01* (2006.01)
  *H04N 5/06* (2006.01)
  *H04N 7/56* (2006.01)

(52) U.S. Cl.
  CPC ................ *H04N 7/56* (2013.01); *H04N 5/06* (2013.01); *H04N 7/013* (2013.01)

(58) Field of Classification Search
  CPC ............ H04N 7/01; H04N 7/013; H04N 5/06; H04N 5/04; H04N 7/56
  (Continued)

(56) References Cited

U.S. PATENT DOCUMENTS 6,661,846 B1  12/2003 Ota
2004/0183945 A1  9/2004 Ochiai et al.
(Continued)

FOREIGN PATENT DOCUMENTS

CN  1591313 A  3/2005
CN  1901615 A  1/2007
(Continued)

OTHER PUBLICATIONS

International search report of PCT application No. PCT/CN2021/070623 issued on Mar. 29, 2021.
(Continued)

*Primary Examiner* — Sherrie Hsia
(74) *Attorney, Agent, or Firm* — Lippes Mathias LLP

(57) ABSTRACT

Provided is a method for transmitting video signals, including: receiving an input video signal provided by a source, wherein the input video signal includes an image signal and a source timing signal; generating a pulse synchronization signal based on the source timing signal and an output frame rate, wherein the output frame rate is a frame rate of outputting the image signal to a display module, and a cycle of the pulse synchronization signal is an integer multiple of a cycle of the source timing signal, and is an integer multiple of a cycle corresponding to the output frame rate; generating an output timing signal based on the pulse synchronization signal; and transmitting an output video signal to the display module, wherein the output video signal includes the image signal and the output timing signal.

20 Claims, 5 Drawing Sheets

(58) Field of Classification Search
USPC .............. 348/500, 521, 537, 547, 441, 464
See application file for complete search history.

(56) References Cited

U.S. PATENT DOCUMENTS

| | | |
|---|---|---|
| 2005/0057551 A1 | 3/2005 | Gong et al. |
| 2009/0256960 A1 | 10/2009 | Chen |
| 2010/0020237 A1 | 1/2010 | Miyasaka et al. |
| 2010/0091186 A1 | 4/2010 | Takata |
| 2015/0172622 A1 | 6/2015 | Yoon et al. |

FOREIGN PATENT DOCUMENTS

| | | |
|---|---|---|
| CN | 101202005 A | 6/2008 |
| CN | 101500174 A | 8/2009 |
| CN | 101719358 A | 6/2010 |
| CN | 103500564 A | 1/2014 |
| CN | 104715728 A | 6/2015 |
| CN | 107087132 A | 8/2017 |

OTHER PUBLICATIONS

China National Intellectual Property Administration, First office action of Chinese application No. 202010049401.1 issued on Nov. 29, 2021, which is foreign counterpart application of this US application.
Non-final office Action of U.S. Appl. No. 17/627,164 issued on Jan. 20, 2023.
Notice of allowance of U.S. Appl. No. 17/627,164 issued on Apr. 24, 2023.

METHOD AND APPARATUS FOR TRANSMITTING VIDEO SIGNALS, AND DISPLAY DEVICE

This application is a continuation of U.S. patent application Ser. No. 17/627,164, filed on Jan. 14, 2022, which is a 371 of PCT/CN2021/070623, filed on Jan. 7, 2021, which claims priority to Chinese Patent Application No. 202010049401.1, filed on Jan. 16, 2020 and entitled "NOVEL SOURCE SYNCHRONOUS DISPLAY METHOD AND APPARATUS," the disclosures of which are incorporated herein by reference in their entireties.

TECHNICAL FIELD

The present disclosure relates to the field of display technologies, and in particular to a method and apparatus for transmitting video signals, and a display device.

BACKGROUND

An ultra-high-definition television (UHDTV) refers to a TV with a pixel count of 3840×2160 (4K×2K) or 7680×4320 (8K×4K). Compared with a pixel count of 1920×1080 (2K×1K) in a full high-definition television (FHDTV), the pixel count of UHDTV has increased by 4 times or 16 times, and therefore its image performance is very clear and delicate.

At present, on a signal output side of an ultra-high-definition display which is equivalent to a signal output (sink for short), a frame rate of outputting signals is generally fixed, such as 60 or 120 hertz (Hz). However, on a signal receiving side of the ultra-high-definition display which is equivalent to a signal input source (source for short), a frame rate of input signals may be 24, 25, or 59.94 Hz in many cases. As a result, the cases where the frame rates of the signal receiving side and the signal output side of the ultra-high-definition display are inconsistent may be present, that is, the frame rates of the source and the sink are inconsistent.

SUMMARY

The present disclosure provides a method and apparatus for transmitting video signals, and a display device.

In one aspect, the present disclosure provides a method for transmitting video signals. The method includes:
  receiving an input video signal provided by a source, wherein the input video signal includes an image signal and a source timing signal;
  generating a pulse synchronization signal based on the source timing signal and an output frame rate, wherein the output frame rate is a frame rate of outputting the image signal to a display module, and a cycle of the pulse synchronization signal is an integer multiple of a cycle of the source timing signal, and is an integer multiple of a cycle corresponding to the output frame rate;
  generating an output timing signal based on the pulse synchronization signal; and
  transmitting an output video signal to the display module, wherein the output video signal includes the image signal and the output timing signal.

Optionally, the source timing signal includes: a source vertical synchronization signal and a valid display data strobe signal; and generating the pulse synchronization signal based on the source timing signal and the output frame rate includes:
  generating an initial pulse signal based on the source vertical synchronization signal and the output frame rate, wherein a pulse in the initial pulse signal is located between a falling edge of the source vertical synchronization signal and a rising edge of the valid display data strobe signal, and a cycle of the initial pulse signal is an integer multiple of a cycle of the source vertical synchronization signal, and is an integer multiple of the cycle corresponding to the output frame rate; and
  acquiring the pulse synchronization signal by converting the initial pulse signal from a clock domain of the source to a clock domain of the display module.

Optionally, generating the initial pulse signal based on the source vertical synchronization signal and the output frame rate includes:
  generating a source pulse signal based on the source vertical synchronization signal and the output frame rate, wherein a rising or falling edge of the source pulse signal is aligned with the falling edge of the source vertical synchronization signal, and a cycle of the source pulse signal is an integer multiple of the cycle of the source vertical synchronization signal, and is an integer multiple of the cycle corresponding to the output frame rate; and
  acquiring the initial pulse signal by delaying the source pulse signal within a target time period, wherein the target time period is a time period between the falling edge of the source vertical synchronization signal and the rising edge of the valid display data strobe signal segment.

Optionally, a pulse width of the source pulse signal is equal to a width of a clock pulse in the clock domain of the source, and a pulse width of the pulse synchronization signal is equal to a width of a clock pulse in the clock domain of the display module.

Optionally, generating the pulse synchronization signal based on the source timing signal and the output frame rate includes:
  determining an input frame rate of the source based on the source timing signal;
  generating the pulse synchronization signal based on the source timing signal in case that the input frame rate is the same as the output frame rate, wherein the cycle of the pulse synchronization signal is equal to the cycle of the source timing signal; and
  generating the pulse synchronization signal based on a ratio of the input frame rate to the output frame rate and the source timing signal in the case that the input frame rate is different from the output frame rate, wherein the cycle of the pulse synchronization signal is greater than or equal to the cycle of the source timing signal.

Optionally, a frequency of the pulse synchronization signal is equal to the greatest common divisor of a frequency of the source timing signal and the output frame rate.

Optionally, generating the pulse synchronization signal based on the ratio of the input frame rate to the output frame rate and the source timing signal includes:
  acquiring the pulse synchronization signal by generating a synchronization pulse every target number of pulses of the source timing signal;
  wherein the target number is a former term of the simplest ratio of the input frame rate to the output frame rate.

Optionally, upon receiving the video signal provided by the source, the method further includes: writing the image signal into a memory; and reading the image signal from the memory based on the output timing signal in response to generating the output timing signal based on the pulse synchronization signal.

In another aspect, the present disclosure also provides an apparatus for transmitting video signals. The apparatus includes:

a receiving module, configured to receive an input video signal provided by a source, wherein the input video signal includes an image signal and a source timing signal;

a pulse generating module, configured to generate a pulse synchronization signal based on the source timing signal and an output frame rate, wherein the output frame rate is a frame rate of outputting the image signal to a display module, and a cycle of the pulse synchronization signal is an integer multiple of a cycle of the source timing signal, and is an integer multiple of a cycle corresponding to the output frame rate;

a timing generating module, configured to generate an output timing signal based on the pulse synchronization signal; and a transmitting module, configured to transmit an output video signal to the display module, wherein the output video signal includes the image signal and the output timing signal.

Optionally, the source timing signal includes: a source vertical synchronization signal and a valid display data strobe signal; and the pulse generating module is configured to:

generate an initial pulse signal based on the source vertical synchronization signal and the output frame rate, wherein a pulse in the initial pulse signal is located between a falling edge of the source vertical synchronization signal and a rising edge of the valid display data strobe signal and, and a cycle of the initial pulse signal is an integer multiple of the cycle of the source vertical synchronization signal, and is an integer multiple of the cycle corresponding to the output frame rate; and acquire the pulse synchronization signal by converting the initial pulse signal from a clock domain of the source to a clock domain of the display module.

Optionally, the pulse generating module is configured to:
generate a source pulse signal based on the source vertical synchronization signal and the output frame rate, wherein a rising or falling edge of the source pulse signal is aligned with the falling edge of the source vertical synchronization signal, and a cycle of the source pulse signal is an integer multiple of the cycle of the source vertical synchronization signal, and is an integer multiple of the cycle corresponding to the output frame rate; and acquire an initial pulse signal by delaying the source pulse signal within a target time period, wherein the target time period is a time period between the falling edge of the source vertical synchronization signal and the rising edge of the valid display data strobe signal.

Optionally, a pulse width of the source pulse signal is equal to a width of a clock pulse in the clock domain of the source, and a pulse width of the pulse synchronization signal is equal to a width of a clock pulse in the clock domain of the display module.

Optionally, the pulse generating module is configured to:
determine an input frame rate of the source based on the source timing signal;

generate the pulse synchronization signal based on the source timing signal in the case that the input frame rate is the same as the output frame rate, wherein the cycle of the pulse synchronization signal is equal to the cycle of the source timing signal; and generate the pulse synchronization signal based on a ratio of the input frame rate to the output frame rate and the source timing signal in case that the input frame rate is different from the output frame rate, wherein the cycle of the pulse synchronization signal is greater than or equal to the cycle of the source timing signal.

Optionally, a frequency of the pulse synchronization signal is equal to the greatest common divisor of a frequency of the source timing signal and the output frame rate.

Optionally, the pulse generating module is configured to:
acquire the pulse synchronization signal by generating a synchronization pulse every target number of pulses of the source timing signal;

wherein the target number is a former term of the simplest ratio of the input frame rate to the output frame rate.

Optionally, the device further includes:
a writing module, configured to write the image signal into a memory in response to the receiving module receiving the video signal provided by the source; and a reading module, configured to read the image signal from the memory based on the output timing signal in response to the timing generating module generating the output timing signal.

In still another aspect, the present disclosure also provides an apparatus for transmitting video signals. The apparatus includes: a memory, a processor, and a computer program stored in the memory and runnable on the processor, wherein the processor, when running the program, is caused to perform the method for transmitting video signals as described above.

In yet still another aspect, the present disclosure also provides a computer-readable storage medium on which a computer program is stored, wherein the computer program, when run by a processor, causes the processor to perform the method for transmitting video signals as described above.

In yet still another aspect, the present disclosure also provides a display device. The display device includes: a source, a display module, and an apparatus for transmitting video signals according to the above aspect.

Optionally, the display device further includes: a memory, wherein the memory is connected to the transmission apparatus, and the memory is configured to store the image signal in the video signal.

DETAILED DESCRIPTION

Hereinafter, exemplary embodiments of the present disclosure are described in more detail with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Regardless of whether frame rates of a source and a sink are the same, since clock domains of the source and the sink are different, errors in timing of input and output are inevitable, and the errors may accumulate. Eventually, dropped frames or duplicated frames may be caused by unsynchronized timing of the source and the sink.

Figure 1:
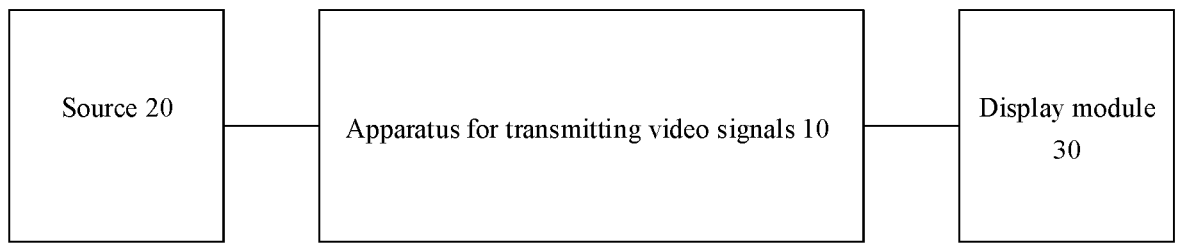
FIG. 1 is a schematic structural diagram of a display device according to an embodiment of the disclosure.

FIG. 1 is a schematic structural diagram of a display device according to an embodiment of the present disclosure. As shown in FIG. 1, the display device includes an apparatus 10 for transmitting video signals, a source 20, and a display module 30. The display module 30 may also be referred to as a sink. The source 20 may be a system on chip (SOC). The apparatus 10 for transmitting video signals may transmit a video signal provided by the source 20 to the display module 30, and can ensure timing synchronization of the source 20 and the display module 30.

Optionally, the apparatus 10 for transmitting video signals may transmit the video signal based on V-By-One (VBO) technology. Accordingly, the video signal may also be referred to as a VBO signal. VBO is a digital interface standard technology for image information transmission. Since this technology can support up to 4.0 gigabits per second (Gbps) high-speed signal transmission, and its unique encoding method avoids the time lag between the receiving end data and the clock, the VBO technology is widely used in the field of ultra-high-definition LCD TVs, making ultra-thin and ultra-narrow TVs possible.

Figure 2:
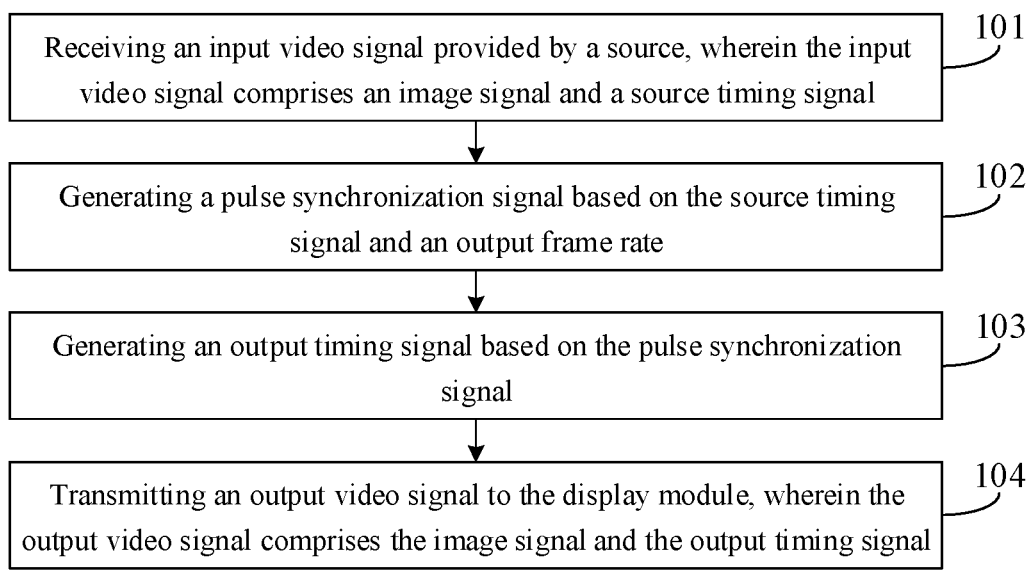
FIG. 2 is a flowchart of a method for transmitting video signals according to an embodiment of the disclosure.

An embodiment of the present disclosure provides a method for transmitting video signals. This method is applicable to the apparatus 10 for transmitting video signals shown in FIG. 1. As shown in FIG. 2, the method includes the following steps.

In step 101, an input video signal provided by a source is received, wherein the input video signal includes an image signal and a source timing signal.

In the embodiment of the present disclosure, the input video signal may be a VBO signal. The source timing signal may include a source vertical synchronization (VS) signal and a source valid display data strobe (DE) signal.

In step 102, a pulse synchronization signal is generated based on the source timing signal and an output frame rate.

The output frame rate is a frame rate of the apparatus for transmitting video signals outputting the image signal to the display module (i.e., sink), and is a fixed value pre-configured in the apparatus for transmitting video signals. A cycle of the pulse synchronization signal is an integer multiple of a cycle of the source timing signal, and is an integer multiple of a cycle corresponding to the output frame rate. For example, the cycle of the pulse synchronization signal may be equal to the cycle of the source timing signal, and be equal to the cycle corresponding to the output frame rate.

The cycle corresponding to the output frame rate refers to a reciprocal of the output frame rate. For example, assuming that the output frame rate is 60 Hz, the cycle corresponding to the output frame rate is 1/60 second (s).

In step 103, an output timing signal is generated based on the pulse synchronization signal.

In the embodiment of the present disclosure, the apparatus for transmitting video signals can use the pulse synchronization signal as a reference to generate the output timing signal. The output timing signal includes an output vertical synchronization signal and an output valid display data strobe. Moreover, a cycle of the output timing signal is equal to the reciprocal of the output frame rate.

It can be understood that, in the embodiments of the present disclosure, the source timing signal may also include a source horizontal synchronization (HS) signal. Accordingly, the output timing signal may also include an output horizontal synchronization signal.

In step 104, an output video signal is sent to the display module, wherein the output video signal includes the image signal and the output timing signal.

In the embodiment of the present disclosure, the apparatus for transmitting video signals may first store the image signal in the input video signal into a memory upon acquiring the input video signal. The apparatus for transmitting video signals may read the image signal from the memory based on the output timing signal in response to generating the output timing signal, and transmit the output video signal including the image signal and the output timing signal to the display module. The display module may then display an image based on the image signal and the output timing signal. For example, the display module may display ultra-high-definition pictures.

In summary, the embodiments of the present disclosure provide a method for transmitting video signals. The apparatus for transmitting video signals may generate a pulse synchronization signal based on a source timing signal and an output frame rate, and generate an output timing signal based on the pulse synchronization signal. In this way, cyclic synchronization between the source timing signal and the output timing signal can be realized (the synchronization cycle is a cycle of the pulse synchronization signal), and continuous accumulation of clock errors between the source timing signal and the output timing signal resulting in dropped frames or duplicated frames can be avoided, which ensures the image display effect of the display module.

Moreover, since the synchronization cycle is an integer multiple of the cycle of the source timing signal and an integer multiple of the cycle corresponding to the output frame rate, it is ensured that timing synchronization is completed in a blanking interval. That is, within each synchronization cycle, the source may input integer frames of images, and the transmission apparatus may also output integer frames of images to the display module, so as to avoid timing synchronization affecting the normal display of the image.

Figure 3:
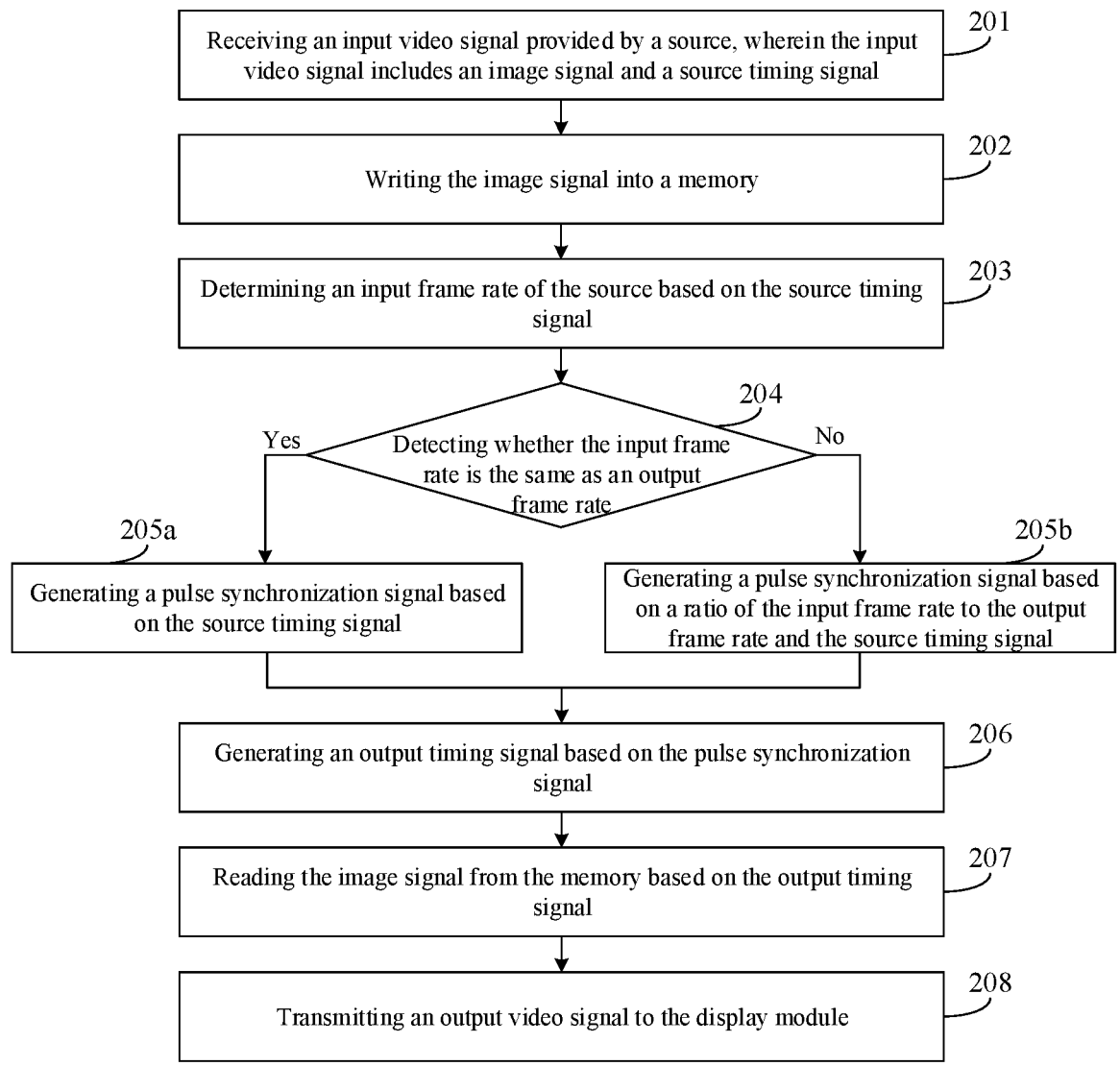
FIG. 3 is a schematic diagram of another method for transmitting video signals according to an embodiment of the disclosure.

FIG. 3 is another method for transmitting video signals according to an embodiment of the present disclosure. This method is applicable to the apparatus 10 for transmitting video signals shown in FIG. 1. As shown in FIG. 3, the method includes the following steps.

In step 201, an input video signal provided by a source is received, wherein the input video signal includes an image signal and a source timing signal.

In the embodiment of the present disclosure, the input video signal may be a VBO signal. The source timing signal may include a source vertical synchronization signal and a source valid display data strobe signal. In addition, the source timing signal may also include a source horizontal synchronization signal.

Figure 4:
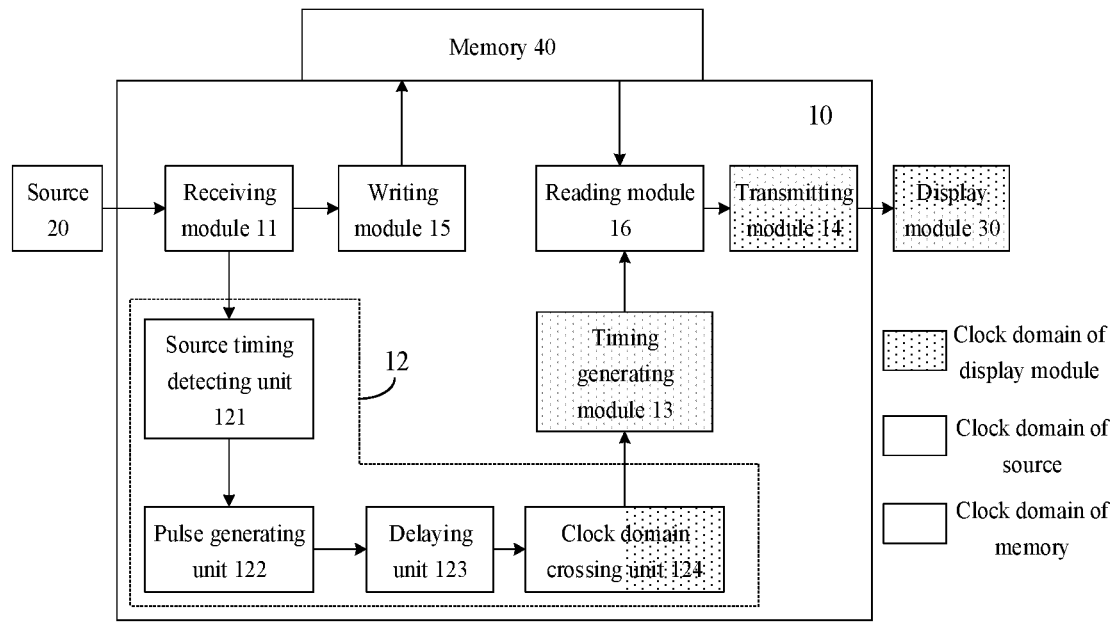
FIG. 4 is a schematic structural diagram of an apparatus for transmitting video signals according to an embodiment of the disclosure.

FIG. 4 is a schematic structural diagram of an apparatus for transmitting video signals according to an embodiment of the present disclosure. As shown in FIG. 4, the transmission apparatus may include a receiving module 11 connected to the source 20. The receiving module 11 may be configured to receive the input video signal provided by the source 20. For example, assuming that the input video signal is a VBO signal, the receiving module 11 may also be referred to as a VBO receiving (RX) module.

In step 202, the image signal is written into a memory.

The display device according to the embodiment of the present disclosure may further include a memory. The apparatus for transmitting video signals is connected to the memory. The apparatus for transmitting video signals may parse the received input video signal to acquire the image signal and the source timing signal in the input video signal, and may write the image signal into the memory.

In an exemplary embodiment, referring to FIG. 4, the apparatus 10 for transmitting video signals further includes a writing module 15 connected to both the memory 40 and the receiving module 11, wherein the writing module 15 may be configured to write the image signal in the input video signal into the memory 40. The memory 40 may be a double data rate (DDR) synchronous dynamic random access memory. The writing module 15 may be a write direct memory access (WDMA) module.

In step 203, an input frame rate of the source is determined based on the source timing signal.

In the embodiment of the present disclosure, the apparatus for transmitting video signals may determine the input frame rate of the source based on the source timing signal in response to acquiring the source timing signal from the input video signal. The input frame rate is equal to the reciprocal of the cycle of the source timing signal, that is, the input frame rate is equal to the frequency of the source timing signal.

In an exemplary embodiment, with continued reference to FIG. 4, the apparatus 10 for transmitting video signals further includes a pulse generating module 12. The pulse generating module 12 includes a source timing detecting (DET) unit 121 connected to the receiving module 11. The source timing detecting unit 121 is configured to detect the frequency of the source timing signal, that is, to detect the input frame rate of the source.

It can be understood that, in the embodiments of the present disclosure, the frame rate refers to the number of frames of images refreshed in one second. For example, assuming that the input frame rate is 24 Hz and the resolution of each frame of image is 3840×2160, it is equivalent to refreshing 24 frames of images in one second, and the resolution of each frame of image is 3840×2160.

In step 204, whether the input frame rate and the output frame rate are the same is detected.

The apparatus for transmitting video signals stores the frame rate of outputting the image signal to the display module in advance, that is, the output frame rate. The output frame rate is a fixed value. For example, the output frame rate is generally 60 Hz or 120 Hz. However, the input frame rate of the signal receiving side (the source) of the display device is not fixed. For example, it may be 24 Hz, 25 Hz or 59.94 Hz and the like, and thus the frame rates of the signal receiving side and the signal output side of the apparatus for transmitting video signals are inconsistent, that is, the frame rates of the source and the sink are inconsistent. The frame rates of the source and the sink may also be consistent.

The apparatus for transmitting video signals may perform step 205*a* in the case that the input frame rate is the same as the output frame rate. The apparatus for transmitting video signals may perform step 205*b* in the case that the input frame rate is different from the output frame rate.

In step 205*a*, a pulse synchronization signal is generated based on the source timing signal.

The apparatus for transmitting video signals may directly generate the pulse synchronization signal based on the source timing signal in the case that the input frame rate is the same as the output frame rate. In addition, a cycle of the pulse synchronization signal is equal to the cycle of the source timing signal, and is accordingly equal to the cycle corresponding to the output frame rate.

In step 205*b*, a pulse synchronization signal is generated based on a ratio of the input frame rate to the output frame rate and the source timing signal.

The apparatus for transmitting video signals may generate the pulse synchronization signal based on the ratio of the input frame rate to the output frame rate and the source timing signal in the case that the input frame rate is different from the output frame rate.

The cycle of the pulse synchronization signal may be greater than or equal to the cycle of the source timing signal. Optionally, in the embodiment of the present disclosure, the frequency of the pulse synchronization signal may be equal to the greatest common divisor of the input frame rate (i.e., the frequency of the source timing signal) and the output frame rate in the case that the input frame rate and the output frame rate are both integers.

In an exemplary embodiment, assuming that the input frame rate is 24 Hz (i.e., the cycle of the source timing signal is ¹⁄₂₄ s), and the output frame rate is 60 Hz (i.e., the cycle corresponding to the output frame rate is ¹⁄₆₀ s), then the frequency of the pulse synchronization signal may be 12 Hz. That is, within the cycle (i.e., synchronization cycle) of each pulse synchronization signal, the source may input 2 frames of images to the transmission apparatus, and accordingly, the transmission apparatus may output 5 frames of images to the display module.

Figure 5:
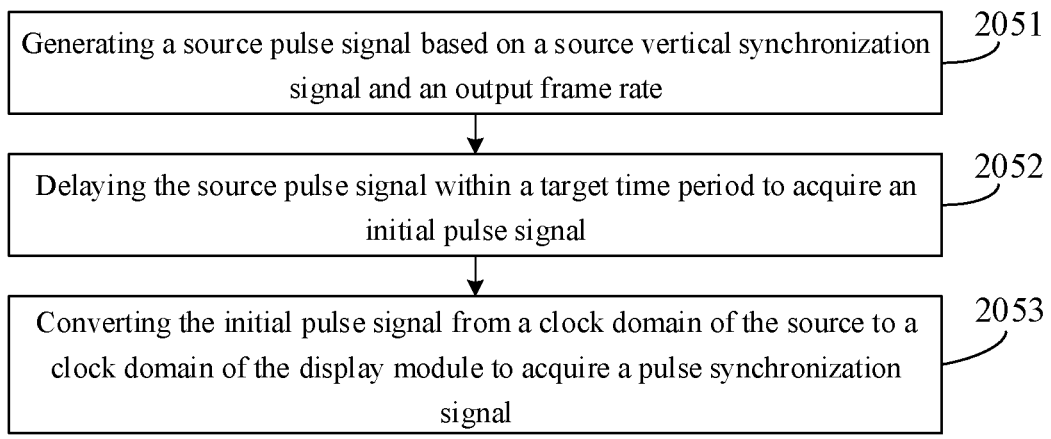
FIG. 5 is a flowchart of a method for generating a pulse synchronization signal according to an embodiment of the disclosure.

FIG. 5 is a flowchart of a method for generating a pulse synchronization signal according to an embodiment of the present disclosure. Referring to FIG. 5, the implementation process of step 205*a* and step 205*b* may include the following steps.

In step 2051, a source pulse signal is generated based on a source vertical synchronization signal and the output frame rate.

A rising or falling edge of the source pulse signal is aligned with the falling edge of the source vertical synchronization signal, and a cycle of the source pulse signal is an integer multiple of the cycle of the source vertical synchronization signal, and is an integer multiple of the cycle corresponding to the output frame rate.

Optionally, referring to FIG. 4, the pulse generating module 12 may further include a pulse generating unit 122 connected to the source timing detecting unit 121. The source timing detecting unit 121 may transmit the source vertical synchronization signal and the input frame rate of the source to the pulse generating unit 122. The pulse generating unit 122 may further generate the source pulse signal based on the input frame rate and the source vertical synchronization signal.

On one hand, in a scenario where the input frame rate and the output frame rate are equal, the transmission apparatus may directly generate the source pulse signal based on the source timing signal, and then generate the pulse synchronization signal based on the source pulse signal. The cycle of the source pulse signal may be equal to the cycle of the source vertical synchronization signal, and may be accordingly equal to the cycle corresponding to the output frame rate. That is, the transmission apparatus may generate a synchronization pulse of the source pulse signal at each falling edge of the source vertical synchronization signal. Therefore, it is ensured that within the cycle (i.e., synchronization cycle) of each pulse synchronization signal, the transmission apparatus outputs a frame of image to the display module while the source inputs a frame of image to the transmission apparatus.

Figure 6:
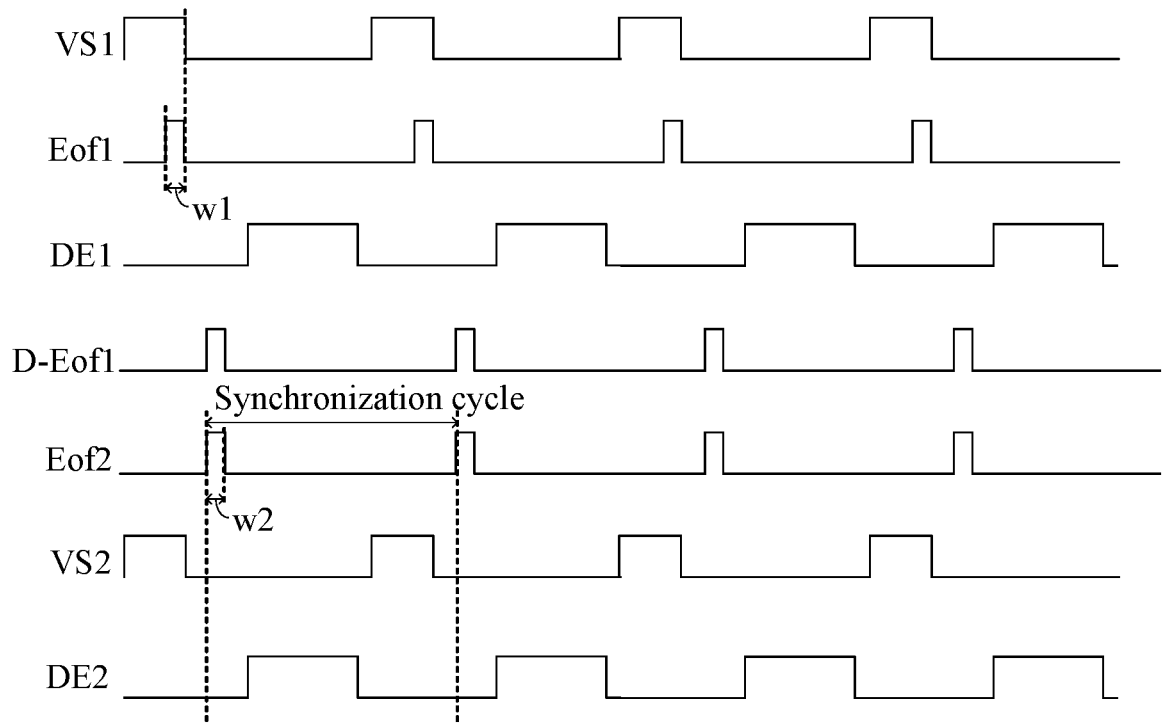
FIG. 6 is a signal timing diagram according to an embodiment of the disclosure.

In an exemplary embodiment, referring to FIG. 6, the pulse generating unit 122 may generate a synchronization pulse of the source pulse signal Eof1 at each falling edge of the source vertical synchronization signal VS1. A falling edge of the synchronization pulse is aligned with the falling edge of the source vertical synchronization signal VS1, and a width w1 of the synchronization pulse (i.e., a pulse width of the source pulse signal Eof1) may be equal to a width of a clock pulse in the clock domain of the source.

On the other hand, in a scenario where the input frame rate and the output frame rate are unequal, the transmission apparatus may generate the source pulse signal based on the ratio of the input frame rate to the output frame rate and the source timing signal, and then generate the pulse synchronization signal based on the source pulse signal.

Optionally, the frequency of the source pulse signal may be equal to the minimum common divisor of the frequency of the source vertical synchronization signal and the output frame rate. For example, the pulse generating unit 122 may generate a synchronization pulse every target number of pulses of the source timing signal (e.g., the source vertical synchronization signal) to acquire the source pulse signal. The target number is a former term of the simplest ratio of the input frame rate to the output frame rate. Therefore, it is ensured that within each synchronization cycle, the transmission apparatus outputs a first number of frames of images to the display module while the source inputs the target number of frames of images. The first number is a latter term of the simplest ratio.

That is, the pulse generating unit 122 may first determine the greatest common divisor of the input frame rate and the output frame rate, and then reduce the ratio of the input frame rate to the output frame rate with the greatest common divisor, making the former and latter terms of the reduced ratio mutually prime, so as to acquire the simplest ratio of the input frame rate to the output frame rate. After that, the pulse generating unit 122 may generate the source pulse signal by using the former term of the simplest ratio as a pulse interval.

Figure 7:
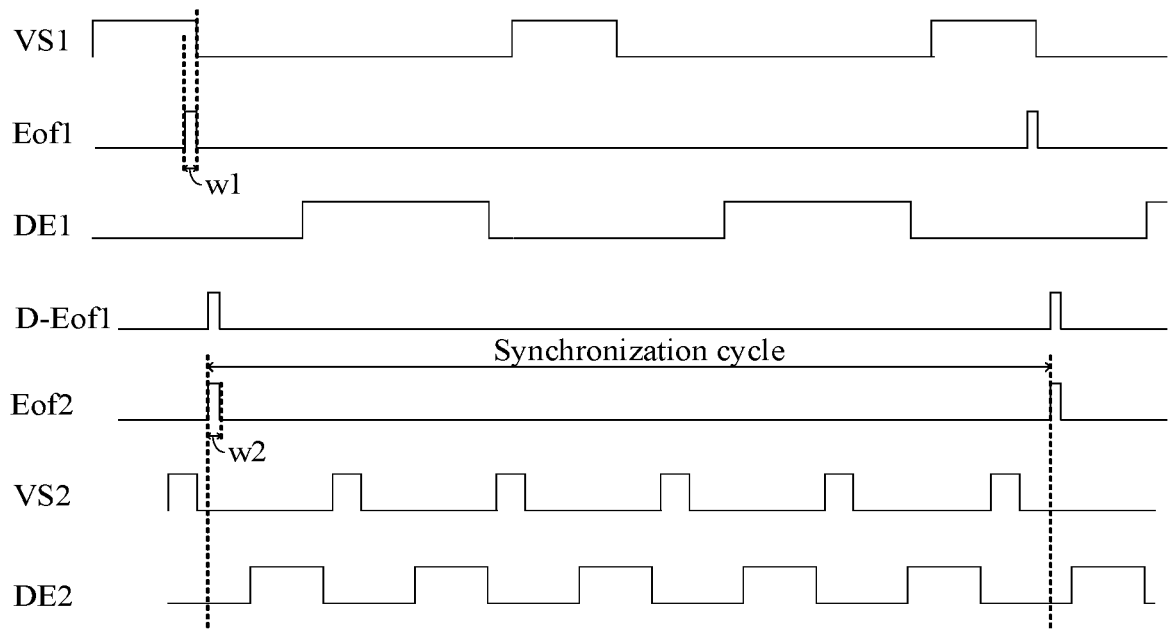
FIG. 7 is another signal timing diagram according to an embodiment of the disclosure.

For example, referring to FIG. 7, assuming that the input frame rate of the source is 24 Hz (i.e., the frequency of the source vertical synchronization signal VS1 is 24 Hz), and the output frame rate is 60 Hz, then the pulse generating unit 122 may determine that the ratio of the input frame rate to the output frame rate is 24:60, and may reduce the ratio 24:60 of the input frame rate to the output frame rate with the greatest common divisor 12 of the input frame rate and the output frame rate, that is, divide 24 by 12 to acquire the former term 2 of the simplest ratio, and divide 60 by 12 to acquire the latter term of the simplest ratio. Thus, the simplest ratio of the input frame rate to the output frame rate of 2:5 may be acquired by calculation. Since the former term of the simplest ratio is 2, as shown in FIG. 7, the pulse generating unit 122 may generate a synchronization pulse every two pulses of the source vertical synchronization signal VS1, thereby acquiring the source pulse signal Eof1. A falling edge of the synchronization pulse may be aligned with the falling edge of the source vertical synchronization signal VS1. As a result, it is ensured that within each synchronization cycle, the transmission apparatus outputs 5 frames of images to the display module while the source may input 2 frames of images.

It can be understood that, in the embodiment of the present disclosure, the moment of triggering the generation of the synchronization pulse of the source pulse signal Eof1 may also be referred to as a synchronization time point. Accordingly, the falling edge of every target number of pulses in the source vertical synchronization signal VS1 is a synchronization time point.

In step 2052, the source pulse signal is delayed within the target time period to acquire an initial pulse signal.

The target time period is a time period between the falling edge of the source vertical synchronization signal and the rising edge of the valid display data strobe signal.

Referring to FIG. 4, the pulse generating module 12 may further include a delaying unit 123 connected to the pulse generating unit 122. As shown in FIGS. 6 and 7, the delaying unit 123 may delay the source pulse signal Eof1 to acquire an initial pulse signal D-Eof1. A pulse of the initial pulse signal D-Eof1 is located between the falling edge of the source vertical synchronization signal VS1 and the rising edge of the valid display data strobe signal DE1.

Since the pulse of the source pulse signal is for the purpose of triggering the generation of a new output timing signal, delaying the source pulse signal can avoid a first pulse of the new output timing signal generated being located at the pulse edge of the source timing signal. Furthermore, it is possible to avoid glitches in the output vertical synchronization signal in the output timing signal, and avoid glitches in the valid display data strobe signal in the output timing signal. That is, by delaying the source pulse signal, VS glitches or DE glitches caused by unsynchronized timing can be avoided.

It can be understood that, in the embodiment of the present disclosure, the delay time of the source pulse signal Eof1 can be controlled/adjusted by the delaying unit 12, as long as it is ensured that the delayed pulse is located between the falling edge of the source vertical synchronization signal VS1 and the rising edge of the valid display data strobe signal DE1.

In step 2053, the initial pulse signal is switched from a clock domain of the source to a clock domain of the display module to acquire a pulse synchronization signal.

Since the clock domain of the source is different from the clock domain of the display module, it is necessary to perform clock domain converting on the initial pulse signal to acquire the pulse synchronization signal that is intended for triggering the generation of the output timing signal.

In an exemplary embodiment, referring to FIG. 4, the pulse generating module 12 may further include a clock domain crossing (CDC) unit 124 connected to the delaying unit 123. As shown in FIGS. 6 and 7, the CDC unit 124 may perform clock domain converting on the initial pulse signal D-Eof1 to acquire a pulse synchronization signal Eof2. A pulse width w2 of the pulse synchronization signal Eof2 is equal to a width of a clock pulse in the clock domain of the display module.

It can be understood that, in the embodiment of the present disclosure, since the initial pulse signal is acquired by delaying the source pulse signal, the pulse synchronization signal is acquired by performing clock domain converting on the initial pulse signal. The above delay processing and clock domain converting processing do not change the cycle (or frequency) of the signal, and thus cycles of the initial pulse signal and the pulse synchronization signal are equal to the cycle of the source pulse signal, and both are an integer multiple of the cycle of the source vertical synchronization signal, and an integer multiple of the cycle corresponding to the output frame rate.

In step 206, an output timing signal is generated based on the pulse synchronization signal.

In the embodiment of the present disclosure, the apparatus for transmitting video signals may generate the output timing signal by taking the pulse synchronization signal as a reference. The output timing signal includes an output vertical synchronization signal and an output valid display data strobe. Moreover, a cycle of the output timing signal is equal to a reciprocal of the output frame rate.

With continued reference to FIG. 4, the apparatus for transmitting video signals further includes a timing generating module 13. The timing generating module 13 is connected to the pulse generating module 12, and may generate the output timing signal based on the pulse synchronization signal provided by the pulse generating module 12.

Optionally, the timing generating module 13 may include a pixel counter (P counter) and a line counter. The pixel counter may count in cycles with the clock of the clock domain of the display module as a unit and a target value as an upper limit, and the pixel counter may restart counting every time a synchronization pulse of a pulse synchronization signal is detected. The line counter may count in units of the target value acquired through statistics by the pixel counter, that is, the line counter may increment a count value of the line counter+1 when a count value of the pixel counter reaches the target value.

Assuming that the target value is 100, then the pixel counter may count in cycles from 1 to 100 according to the clock of the display module's clock domain in each synchronization cycle, and may restart counting from 1 when the synchronization pulse arrives. The line counter may increment the count value of the pixel counter+1 when the count value of the pixel counter reaches 100.

After that, the timing generating module 13 may generate the output valid display data strobe signal based on the count value of the pixel counter, and may generate the output vertical synchronization signal based on the count value of the line counter. For example, the timing generating module 13 may trigger the generation of the pulse of the output vertical synchronization signal when the count value of the line counter is within a certain numerical range, and may trigger the generation of the pulse of the valid display data strobe signal when the count value of the pixel counter is within a certain numerical range.

Based on the above description and the timing shown in FIGS. 6 and 7, it can be seen that, in the embodiment of the present disclosure, a synchronization pulse may be generated before the rising edge of the output valid display data strobe signal to trigger a new output timing signal. The valid display data strobe signal is a high-level valid signal, and the video data signal corresponding to the high level of the valid display data strobe signal is regarded as a valid data signal. Therefore, by generating the synchronization pulse before the rising edge of the output valid display data strobe signal, that is, during the blanking interval, it is ensured that the clock error in the previous synchronization cycle is forced to be cleared, and counting is restarted to generate a new timing, which effectively avoids the accumulation of clock errors affecting the display effect.

It can be understood that, in the embodiments of the present disclosure, the source timing signal may also include a source horizontal synchronization signal and accordingly, the output timing signal may also include an output horizontal synchronization signal.

In step 207, the image signal is read from the memory based on the output timing signal.

As shown in FIG. 4, the apparatus for transmitting video signals according to the embodiment of the present disclosure further includes a reading module 16 connected to the timing generating module 13. The reading module 16 is also connected to the memory 40 and may read the image signal from the memory 40 based on the output timing signal provided by the timing generating module 13. The reading module 16 may be a read direct memory access (RDMA) module.

Furthermore, referring to FIG. 4, it can be seen that the clock domains of the writing module 15 and the reading module 16 are both the clock domain of the memory 40.

In step 208, an output video signal is sent to the display module.

With continued reference to FIG. 4, the apparatus for transmitting video signals according to the embodiment of the present disclosure further includes a transmitting module 14 connected to both the reading module 16 and the display module 30. The transmitting module 14 may transmit an output video signal including the output timing signal and the image signal to the display module 30. The display module 30 may then display images based on the output video signal. For example, the display module 30 may display ultra-high-definition images. The transmitting module 14 may also be referred to as a VBO transmitting (TX) module in the case that the output video signal is a VBO signal.

It should be understood that for scenarios where the input frame rate of the source and the output frame rate of the display module are the same, due to the existence of on-screen display (OSD), the display module must have a separate clock domain.

For example, when watching TV, a display screen of the display module also displays information such as HDMI/signal/no signal, among which HDMI refers to high-definition multimedia interface. Alternatively, the display module may display corresponding menu options on the display screen according to a user's adjustment operation under the OSD. At this time, the display screen outputting the valid display screen is not because of the source receiving the VBO signal, the display module side needs to be supported by a separate clock domain.

Since the display module requires a separate clock domain, it means that the clock of the apparatus for transmitting video signals to output video signals cannot depend on the clock of the input video signal of the source. For example, when the VBO signal does not enter the display module, it is equivalent to no signal input. However, due to the existence of OSD, the outputting images by the display module is still required to ensure, so a separate clock domain is required. Since the clock domains of the source and the display module are different, a clock error between the input video signal input from the source and the output video signal output to the display module is inevitably present. As the clock error continues to accumulate, situations that seriously affect the display effect such as dropped frames or duplicated frames may be present.

In the embodiment of the present disclosure, the apparatus for transmitting video signals may generate a pulse synchronization signal based on a source timing signal, and may generate an output timing signal under the trigger of a synchronization pulse of the pulse synchronization signal. Thus, cyclic synchronization of the source timing signal and the output timing signal can be realized, that is, at the beginning of each synchronization cycle (i.e., at the end of the previous synchronization cycle), the clock error in the previous synchronization cycle is eliminated, which effectively avoids the accumulation of clock errors affecting the display effect. The cycle of the pulse synchronization signal is a synchronization cycle for synchronizing the source timing signal and the output timing signal.

For a scenario where the input frame rate and the output frame rate are equal, the cycle of the pulse synchronization signal may be equal to the cycle of the source timing signal. Thus, it is ensured that, in each synchronization cycle, the apparatus for transmitting video signals receives a frame of image input from the source, and the apparatus for transmitting video signals may output a frame of image to the display module. That is, it is ensured that the time for the source to input a frame of image to the transmission apparatus is strictly equal to the time for the transmission apparatus to output a frame of image to the display module, thereby reducing accumulated errors.

For a scenario where the input frame rate and the output frame rate are unequal, the cycle of the pulse synchronization signal may be equal to an integer multiple of the cycle of the source timing signal, and equal to an integer multiple of the cycle corresponding to the output frame rate. Thus, it is ensured that, in each synchronization cycle, the ratio of the number of frames of images input by the source to the transmission apparatus to the number of frames of images output by the transmission apparatus to the display module always remain unchanged.

For example, assuming that the input frame rate is 24 Hz and the output frame rate is 60 Hz, based on the solution according to the embodiments of the present disclosure, it is ensured that the apparatus may output 5 frames of images to the display module in a cycle mode while the source inputs 2 frames of images in each synchronization cycle.

In summary, the embodiments of the present disclosure provide a method for transmitting video signals. The apparatus for transmitting video signals may generate a pulse synchronization signal based on a source timing signal and an output frame rate, and generate an output timing signal based on the pulse synchronization signal. Thus, cyclic synchronization between the source timing signal and the output timing signal can be realized (the synchronization cycle is the cycle of the pulse synchronization signal), and continuous accumulation of clock errors between the source timing signal and the output timing signal resulting in dropped frames or duplicated frames can be avoided, ensuring the image display effect of the display module.

Since the synchronization cycle is an integer multiple of the cycle of the source timing signal and an integer multiple of the cycle corresponding to the output frame rate, it is ensured that timing synchronization is completed in a blanking interval. That is, in each synchronization cycle, the source inputs integer frames of images, and the transmission apparatus may also output integer frames of images to the display module, so as to avoid timing synchronization affecting the normal display of the image.

Further, as an implementation of the above method embodiment, an embodiment of the present disclosure provides an apparatus for transmitting video signals. This apparatus embodiment corresponds to the above method embodiment. For ease of reading, in the embodiment of this apparatus, the details in the above method embodiment are not described, but it should be clear that the apparatus in this embodiment may correspondingly implement all the contents in the above method embodiment. Specifically, as shown in FIG. 4, the apparatus for transmitting video signals includes:

a receiving module 11, configured to receive an input video signal provided by a source, where the input video signal includes an image signal and a source timing signal;

a pulse generating module 12, configured to generate a pulse synchronization signal based on the source timing signal and an output frame rate, wherein the output frame rate is a frame rate of outputting the image signal to a display module, and a cycle of the pulse synchronization signal is an integer multiple of a cycle of the source timing signal, and is an integer multiple of a cycle corresponding to the output frame rate;

a timing generating module 13, configured to generate an output timing signal based on the pulse synchronization signal; and a transmitting module 14, configured to transmit an output video signal to the display module, wherein the output video signal includes the image signal and the output timing signal.

Optionally, the source timing signal includes a source vertical synchronization signal and a valid display data strobe signal; and the pulse generating module 12 may include a source timing detecting unit 121, a pulse generating unit 122, a delaying unit 123 and a clock domain converting unit 124.

The source timing detecting unit 121 is configured to determine an input frame rate of the source based on the cycle of the source vertical synchronization signal.

The pulse generating unit 122 and the delaying unit 123 are configured to generate an initial pulse signal based on the source vertical synchronization signal and the output frame rate, wherein a pulse in the initial pulse signal is located between a falling edge of the source vertical synchronization signal and a rising edge of the output frame rate, and a cycle of the initial pulse signal is an integer multiple of the cycle of the source vertical synchronization signal, and is an integer multiple of the cycle corresponding to the output frame rate.

The clock domain crossing unit 124 is configured to convert the initial pulse signal from a clock domain of the source to a clock domain of the display module to acquire the pulse synchronization signal.

Optionally, the pulse generating unit 122 is configured to generate a source pulse signal based on the source vertical synchronization signal and the output frame rate, wherein a rising or falling edge of the source pulse signal is aligned with the falling edge of the source vertical synchronization signal, and a cycle of the source pulse signal is an integer multiple of the cycle of the source vertical synchronization signal, and is an integer multiple of the cycle corresponding to the output frame rate.

The delaying unit 123 is configured to acquire an initial pulse signal by delaying the source pulse signal within a target time period, wherein the target time period is a time period between the falling edge of the source vertical synchronization signal and the rising edge of the valid display data strobe signal.

Optionally, a pulse width of the source pulse signal is equal to a width of a clock pulse in the clock domain of the source, and a pulse width of the pulse synchronization signal is equal to a width of a clock pulse in the clock domain of the display module.

Optionally, the source timing detecting unit 121 in the pulse generating module 12 is configured to determine an input frame rate of the source based on the source timing signal.

The pulse generating unit 122, the delaying unit 123, and the clock domain converting unit 124 may directly the pulse synchronization signal based on the source timing signal in the case that the input frame rate is the same as the output frame rate, wherein the cycle of the pulse synchronization signal is equal to the cycle of the source timing signal.

The pulse generating unit 122, the delaying unit 123, and the clock domain converting unit 124 may generate the pulse synchronization signal based on a ratio of the input frame rate to the output frame rate and the source timing signal in the case that the input frame rate is different from the output frame rate, wherein the cycle of the pulse synchronization signal is greater than or equal to the cycle of the source timing signal.

Optionally, a frequency of the pulse synchronization signal is equal to the greatest common divisor of a frequency of the source timing signal and the output frame rate Optionally, the pulse generating module 12 is configured to generate a synchronization pulse every target number of pulses of the source timing signal to acquire the pulse synchronization signal, wherein the target number is a former term of the simplest ratio of the input frame rate to the output frame rate.

In an exemplary embodiment, the pulse generating unit 122 may generate a synchronization pulse of the source pulse signal every target number of pulses of the source timing signal. The delaying unit 123 delays the source pulse signal, and the clock domain crossing unit 124 acquires the pulse synchronization signal by performing time domain conversion on the delayed pulse signal.

Optionally, with continued reference to FIG. 4, the apparatus may further include:
- a writing module 15, configured to write the image signal into a memory 40 in response to the receiving module 11 receiving the video signal provided by the source 20; and
- a reading module 16, configured to read the image signal from the memory 40 based on the output timing signal in response to the timing generating module 13 generating the output timing signal.

In summary, the embodiments of the present disclosure provide an apparatus for transmitting video signals that may generate a pulse synchronization signal based on a source timing signal and an output frame rate, and generate an output timing signal based on the pulse synchronization signal. Thus, cyclic synchronization between the source timing signal and the output timing signal can be realized (the synchronization cycle is the cycle of the pulse synchronization signal), and continuous accumulation of clock errors between the source timing signal and the output timing signal resulting in dropped frames or duplicated frames can be avoided, which ensures the image display effect of the display module.

Since the synchronization cycle is an integer multiple of the cycle of the source timing signal and an integer multiple of the cycle corresponding to the output frame rate, it is ensured that timing synchronization is completed in a blanking interval. That is, in each synchronization period, the source may input integer frames of images, and the transmission apparatus may also output integer frames of images to the display module, so as to avoid timing synchronization affecting the normal display of the image.

Figure 8:
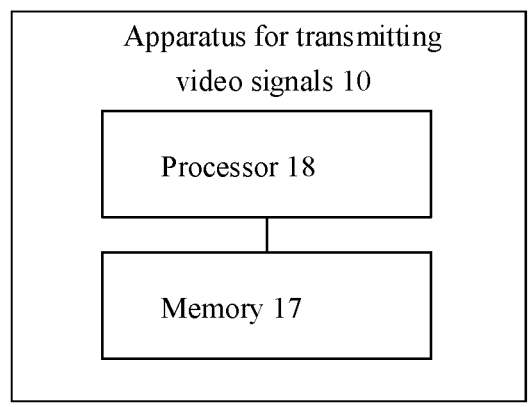
FIG. 8 is a schematic structural diagram of another apparatus for transmitting video signals according to an embodiment of the disclosure.

The embodiment of the present disclosure also provides an apparatus for transmitting video signals. As shown in FIG. 8, the apparatus includes a memory 17, a processor 18, and a program stored on the memory 17 and runnable on the processor 18. The processor 18, when running the program, is caused to perform the method for transmitting video signals as described above.

The embodiments of the present disclosure also provide a computer-readable storage medium on which a computer program is stored. The computer program, when run by a processor, causes the processor to perform the method for transmitting video signals as described above.

An embodiment of the present disclosure also provides a display device. As shown in FIG. 1, the display device includes a source 10, a display module 30, and an apparatus 10 for transmitting video signals as provided in the above embodiment. For example, the apparatus 10 for transmitting video signals may be the apparatus shown in FIG. 4 or FIG. 8.

Optionally, still referring to FIG. 1, the display device may further include a memory 40. The memory 40 is connected to the transmission apparatus 10, and the memory 40 is configured to store the image signal in the video signal.

Optionally, the display device may be an ultra-high-definition display device.

Those skilled in the art should understand that the embodiments of the present disclosure may be provided as a method, a system, or a computer program product. Therefore, the present disclosure may adopt the form of a complete hardware embodiment, a complete software embodiment, or an embodiment combining software and hardware. Moreover, the present disclosure may take the form of a computer program product implemented on one or more computer-usable storage media (including but not limited to a disk storage device, a CD-ROM, an optical storage device, and the like) containing computer-usable program codes.

The present disclosure is described with reference to flowcharts and/or block diagrams of methods, devices (systems), and computer program products according to embodiments of the present disclosure. It should be understood that each process and/or block in the flowchart and/or block diagram, and a combination of processes and/or blocks in the flowchart and/or block diagram can be realized by computer program instructions. These computer program instructions may be provided to a processor of a general-purpose computer, a special-purpose computer, an embedded processor, or other programmable data processing devices to generate a machine, such that the instructions executed by the processor of the computer or other programmable data processing devices produce an apparatus that implements the functions specified in one or more processes in the flowchart and/or one or more blocks in the block diagram.

These computer program instructions may also be stored in a computer-readable memory that may direct a computer or other programmable data processing devices to operate in a specific manner, such that the instructions stored in the computer-readable memory produce an article of manufacture including the instruction apparatus which implements the functions specified in one or more processes in the flowchart and/or one or more blocks in the block diagram.

These computer program instructions may also be loaded on a computer or other programmable data processing devices, such that a series of operations are performed on the computer or other programmable devices to implement computer-implemented processing. In this way, the instructions are executed on the computer or other programmable devices to implement functions specified in one or more processes in the flowchart and/or one or more blocks in the block diagram.

In a typical configuration, the computing device includes one or more processors (CPUs), an input/output interface, a network interface, and a memory.

The memory may include a non-permanent memory, a random-access memory (RAM) and/or a non-volatile memory in computer-readable media, such as a read-only memory (ROM) or a flash memory (flash RAM). The memory is an example of a computer-readable medium.

Computer-readable media includes permanent and non-permanent, removable and non-removable media, and information storage can be realized by any method or technology. The information may be computer-readable instructions, data structures, program modules, or other data. Examples of computer storage media include, but are not limited to, a phase change memory (PRAM), a static random access memory (SRAM), a dynamic random access memory (DRAM), other types of random-access memory (RAM), a read-only memory (ROM), an electrically erasable programmable read-only memory (EEPROM), a flash memory or other memory devices, a CD-ROM, a digital versatile disc (DVD) or other optical storage devices, magnetic cassettes, magnetic tape storage or other magnetic storage devices or any other non-transmission media which may be configured to store information that may be accessed by computing devices. According to the definition herein, computer-readable media does not include transitory computer-readable media, such as modulated data signals and carrier waves.

It should be understood that the terms "include," "including," or any other variants thereof are intended to cover non-exclusive inclusion, such that a process, method, commodity or device including a series of elements not only includes those elements, but also includes other elements that are not explicitly listed, or elements inherent to the process, method, commodity, or devices. An element defined by a sentence "including a . . . " does not exclude the existence of other identical elements in the process, method, commodity, or devices that includes the element in the case that no more restrictions are present.

Described above are merely optional embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for transmitting video signals, comprising:
receiving an input video signal provided by a source, wherein the input video signal comprises an image signal and a source timing signal;
generating a pulse synchronization signal based on the source timing signal and an output frame rate, wherein the output frame rate is a frame rate of outputting the image signal to a display module, and a cycle of the pulse synchronization signal is an integer multiple of a cycle of the source timing signal, and is an integer multiple of a cycle corresponding to the output frame rate;
generating an output timing signal based on the pulse synchronization signal; and
transmitting an output video signal to the display module, wherein the output video signal comprises the image signal and the output timing signal,
wherein the source timing signal comprises: a source vertical synchronization signal and a valid display data strobe signal; and generating the pulse synchronization signal based on the source timing signal and the output frame rate comprises:
generating an initial pulse signal based on the source vertical synchronization signal and the output frame rate, wherein a pulse in the initial pulse signal is between a falling edge of the source vertical synchronization signal and a rising edge of the valid display data strobe signal, and a cycle of the initial pulse signal is an integer multiple of a cycle of the source vertical synchronization signal, and is an integer multiple of the cycle corresponding to the output frame rate; and
acquiring the pulse synchronization signal by converting the initial pulse signal from a clock domain of the source to a clock domain of the display module.

2. The method according to claim 1, wherein generating the initial pulse signal based on the source vertical synchronization signal and the output frame rate comprises:
generating a source pulse signal based on the source vertical synchronization signal and the output frame rate, wherein a rising or falling edge of the source pulse signal is aligned with the falling edge of the source vertical synchronization signal, and a cycle of the source pulse signal is an integer multiple of the cycle of the source vertical synchronization signal, and is an integer multiple of the cycle corresponding to the output frame rate; and
acquiring the initial signal by delaying the source pulse signal within a target time period, wherein the target time period is a time period between the falling edge of the source vertical synchronization signal and the rising edge of the valid display data strobe signal.

3. The method according to claim 2, wherein generating the source pulse signal based on the source vertical synchronization signal and the output frame rate comprises:
determining an input frame rate of the source based on the source timing signal;
determining, in the case that the input frame rate is the same as the output frame rate, that the cycle of the source pulse signal is equal to the cycle of the source vertical synchronization signal; and
determining, in the case that the input frame rate is different from the output frame rate, that a frequency of the source pulse signal is equal to a greatest common divisor of a frequency of the source vertical synchronization signal and the output frame rate.

4. The method according to claim 3, wherein the method, in the case that the input frame rate is different from the output frame rate, comprises:
acquiring the source pulse signal by generating a synchronization pulse every target number of pulses of the source vertical synchronization signal;
wherein the target number is a former term of a simplest ratio of the input frame rate to the output frame rate.

5. The method according to claim 2, wherein a pulse width of the source pulse signal is equal to a width of a clock pulse in the clock domain of the source, and a pulse width of the pulse synchronization signal is equal to a width of a clock pulse in the clock domain of the display module.

6. The method according to claim 2, wherein the cycle of the pulse synchronization signal is greater than or equal to the cycle of the source pulse signal.

7. The method according to claim 1, wherein the output timing signal comprises: an output vertical synchronization signal and an output valid display data strobe; and generating the output timing signal based on the pulse synchronization signal comprises:
generating the output valid display data strobe signal based on a count value of a pixel counter, wherein the pixel counter counts in cycles with the clock of the clock domain of the display module as a unit and a target value as an upper limit, and the pixel counter restarts counting every time a synchronization pulse of the pulse synchronization signal is detected; and
generating the output vertical synchronization signal based on a count value of a line counter, wherein the line counter counts in units of the target value acquired through statistics by the pixel counter.

8. The method according to claim 7, wherein generating the output timing signal based on the pulse synchronization signal further comprises:
triggering a new output timing signal by generating the synchronization pulse of the pulse synchronization signal before a rising edge of the output valid display data strobe signal.

9. The method according to claim 1, wherein upon receiving the video signal provided by the source, the method further comprises:
writing the image signal into a memory; and
reading the image signal from the memory based on the output timing signal in response to generating the output timing signal based on the pulse synchronization signal.

10. An apparatus for transmitting video signals, comprising: a memory, a processor, and a program stored in the memory and runnable on the processor, wherein the processor, when running the program, is caused to perform a method for transmitting video signals, wherein the method comprises:
receiving an input video signal provided by a source, wherein the input video signal comprises an image signal and a source timing signal;
generating a pulse synchronization signal based on the source timing signal and an output frame rate, wherein the output frame rate is a frame rate of outputting the image signal to a display module, and a cycle of the pulse synchronization signal is an integer multiple of a cycle of the source timing signal, and is an integer multiple of a cycle corresponding to the output frame rate;
generating an output timing signal based on the pulse synchronization signal; and
transmitting an output video signal to the display module, wherein the output video signal comprises the image signal and the output timing signal,
wherein the source timing signal comprises: a source vertical synchronization signal and a valid display data strobe signal; and generating the pulse synchronization signal based on the source timing signal and the output frame rate comprises:
generating an initial pulse signal based on the source vertical synchronization signal and the output frame rate, wherein a pulse in the initial pulse signal is between a falling edge of the source vertical synchronization signal and a rising edge of the valid display data strobe signal, and a cycle of the initial pulse signal is an integer multiple of a cycle of the source vertical synchronization signal, and is an integer multiple of the cycle corresponding to the output frame rate; and
acquiring the pulse synchronization signal by converting the initial pulse signal from a clock domain of the source to a clock domain of the display module.

11. The apparatus according to claim 10, wherein generating the initial pulse signal based on the source vertical synchronization signal and the output frame rate comprises:
generating a source pulse signal based on the source vertical synchronization signal and the output frame rate, wherein a rising or falling edge of the source pulse signal is aligned with the falling edge of the source vertical synchronization signal, and a cycle of the source pulse signal is an integer multiple of the cycle of the source vertical synchronization signal, and is an integer multiple of the cycle corresponding to the output frame rate; and
acquiring the initial signal by delaying the source pulse signal within a target time period, wherein the target time period is a time period between the falling edge of the source vertical synchronization signal and the rising edge of the valid display data strobe signal.

12. The apparatus according to claim 11, wherein generating the source pulse signal based on the source vertical synchronization signal and the output frame rate comprises:
determining an input frame rate of the source based on the source timing signal;
determining, in the case that the input frame rate is the same as the output frame rate, that the cycle of the source pulse signal is equal to the cycle of the source vertical synchronization signal; and
determining, in the case that the input frame rate is different from the output frame rate, that a frequency of the source pulse signal is equal to a greatest common divisor of a frequency of the source vertical synchronization signal and the output frame rate.

13. The apparatus according to claim 12, wherein the method, in the case that the input frame rate is different from the output frame rate, comprises:
acquiring the source pulse signal by generating a synchronization pulse every target number of pulses of the source vertical synchronization signal;
wherein the target number is a former term of a simplest ratio of the input frame rate to the output frame rate.

14. The apparatus according to claim 11, wherein a pulse width of the source pulse signal is equal to a width of a clock pulse in a clock domain of the source, and a pulse width of the pulse synchronization signal is equal to a width of a clock pulse in the clock domain of the display module.

15. The apparatus according to claim 10, wherein the output timing signal comprises: an output vertical synchronization signal and an output valid display data strobe; and generating the output timing signal based on the pulse synchronization signal comprises:
generating the output valid display data strobe signal based on a count value of a pixel counter, wherein the pixel counter counts in cycles with the clock of the clock domain of the display module as a unit and a target value as an upper limit, and the pixel counter restarts counting every time a synchronization pulse of the pulse synchronization signal is detected; and
generating the output vertical synchronization signal based on a count value of a line counter, wherein the line counter counts in units of the target value acquired through statistics by the pixel counter.

16. The apparatus according to claim 15, wherein generating the output timing signal based on the pulse synchronization signal further comprises:
   triggering a new output timing signal by generating the synchronization pulse of the pulse synchronization signal before a rising edge of the output valid display data strobe signal.

17. The apparatus according to claim 10, wherein upon receiving the video signal provided by the source, the method further comprises:
   writing the image signal into the memory; and
   reading the image signal from the memory based on the output timing signal in response to generating the output timing signal based on the pulse synchronization signal.

18. A display device, comprising: a source, a display module, and the apparatus as defined in claim 10.

19. The display device according to claim 18, wherein the memory is configured to store the image signal in the video signal.

20. A non-transitory computer-readable storage medium storing a computer program, wherein the computer program, when run by a processor, causes the processor to perform a method for transmitting video signals, and the method comprises:
   receiving an input video signal provided by a source, wherein the input video signal comprises an image signal and a source timing signal;
   generating a pulse synchronization signal based on the source timing signal and an output frame rate, wherein the output frame rate is a frame rate of outputting the image signal to a display module, and a cycle of the pulse synchronization signal is an integer multiple of a cycle of the source timing signal, and is an integer multiple of a cycle corresponding to the output frame rate;
   generating an output timing signal based on the pulse synchronization signal; and
   transmitting an output video signal to the display module, wherein the output video signal comprises the image signal and the output timing signal,
   wherein the source timing signal comprises: a source vertical synchronization signal and a valid display data strobe signal; and generating the pulse synchronization signal based on the source timing signal and the output frame rate comprises:
   generating an initial pulse signal based on the source vertical synchronization signal and the output frame rate, wherein a pulse in the initial pulse signal is between a falling edge of the source vertical synchronization signal and a rising edge of the valid display data strobe signal, and a cycle of the initial pulse signal is an integer multiple of a cycle of the source vertical synchronization signal, and is an integer multiple of the cycle corresponding to the output frame rate; and
   acquiring the pulse synchronization signal by converting the initial pulse signal from a clock domain of the source to a clock domain of the display module.

* * * * *